United States Patent
Bethea et al.

(10) Patent No.: US 7,752,638 B2
(45) Date of Patent: Jul. 6, 2010

(54) METHOD FOR DEFINING AND DYNAMICALLY INVOKING POLYMORPHIC CALL FLOWS

(75) Inventors: Timothy Joel Bethea, Sunnyvale, CA (US); Neil Harold Arthur Boyette, Oregon City, OR (US); Isaac Kam-Chak Cheng, San Jose, CA (US); Dawn Marie Fritz, Wake Forest, NC (US); Vikas Krishna, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/446,947

(22) Filed: Jun. 5, 2006

(65) Prior Publication Data

US 2007/0288244 A1    Dec. 13, 2007

(51) Int. Cl.
*G06F 13/00*    (2006.01)
(52) U.S. Cl. ............... 719/331; 719/313; 719/318; 719/332; 719/330
(58) Field of Classification Search ............ 719/331, 719/332, 313, 318, 330
See application file for complete search history.

(56) References Cited

U.S. PATENT DOCUMENTS

| | | | |
|---|---|---|---|
| 5,404,528 A * | 4/1995 | Mahajan | ............ 719/320 |
| 5,916,308 A * | 6/1999 | Duncan et al. | ............ 719/331 |
| 5,974,118 A | 10/1999 | Capriotti et al. | |
| 6,094,655 A | 7/2000 | Rogers et al. | |
| 6,100,891 A | 8/2000 | Thorne | |
| 6,148,277 A | 11/2000 | Asava et al. | |
| 6,181,935 B1 | 1/2001 | Gossman et al. | |
| 6,587,556 B1 | 7/2003 | Judkins et al. | |
| 6,691,032 B1 | 2/2004 | Irish et al. | |
| 6,785,741 B1 | 8/2004 | Mandalia et al. | |
| 6,795,535 B1 | 9/2004 | Weeren et al. | |
| 6,879,685 B1 | 4/2005 | Peterson et al. | |
| 6,885,734 B1 | 4/2005 | Eberle et al. | |
| 6,914,962 B2 | 7/2005 | Neary | |
| 6,925,155 B2 | 8/2005 | Reynolds et al. | |
| 2004/0005042 A1 | 1/2004 | Dhara et al. | |
| 2004/0225499 A1 | 11/2004 | Wang et al. | |

OTHER PUBLICATIONS

Boyette, et al.; Eclipse Modeling Framework for Document Management; DocEng'05; Nov. 2-4, 2005; Bristol, United Kingdom; ACM 1-59593-240; pp. 220-222.
Cheng, et al; Exploiting XML Technologies for Intelligent Document Routing; DocEng'05; Nov. 2-4, 2005; Bristol, United Kingdom; ACM 1-59593-240; 3 pages.

* cited by examiner

*Primary Examiner*—Andy Ho
(74) *Attorney, Agent, or Firm*—Schmeiser, Olsen & Watts

(57) ABSTRACT

A method for defining and dynamically invoking polymorphic call flows in a call flow system. A publisher call flow and subscriber call flows are defined. A first trigger point in the publisher call flow is defined. Triggers specifying late-binding references to trigger points are defined in the subscriber call flows. A second trigger point in a first subscriber call flow is defined. A trigger specifying a late-binding reference to the second trigger point is defined. Publishing the call flows includes storing a second subscriber call flow's representation that includes a first trigger's representation. To execute the publisher call flow, identifiers of the publisher call flow and the first trigger point are located in the first trigger's representation. Without changing any other call flow and without terminating and restarting the publisher call flow, a call flow is added to the call flow system and invoked.

1 Claim, 10 Drawing Sheets

460

| User is Employee? | Contract Number | Call Flows Executed |
|---|---|---|
| NO | ABC | A1 → A2 |
| YES | ABC | A1 → B → A2 |
| NO | XYZ | A1 → C → A2 |
| YES | XYZ | A1 → B → C → A2 |

FIG. 4D

METHOD FOR DEFINING AND DYNAMICALLY INVOKING POLYMORPHIC CALL FLOWS

CROSS-REFERENCE TO RELATED INVENTION

This invention is related to U.S. patent application Ser. No. 11/415,788 entitled "METHOD AND SYSTEM FOR SPECIFYING, DEPLOYING AND DYNAMICALLY UPDATING WORK FLOWS", filed on May 2, 2006, assigned to the same assignee as the present application, and hereby incorporated herein by reference in its entirety.

FIELD OF THE INVENTION

The present invention relates to a system and method for defining and dynamically invocating polymorphic call flows.

BACKGROUND OF THE INVENTION

Conventional development of call flow models involves writing a single script to represent the full life cycle of the call flow. All logic required for the handling of conditions, problems and solutions represented in the call flow are encompassed by a single script. Blocks of logic are recreated repeatedly to provide logic that is common to different parts of a call flow or to multiple call flows. For example, multiple call flows include logic to validate a customer's identity based on the customer's social security number (SSN). If this validation logic becomes more stringent by adding a request for an employee ID in addition to the SSN, each occurrence of the validation logic in each affected call flow needs to be updated with the added validation step.

To overcome the aforementioned problem, certain known systems provide scripts that "include" or "import" other scripts. This technique allows common logic to be separated and specified in a script which is then referenced as needed from all other scripts employing that logic. This ability eliminates the nuisance of having to reconstruct or update the common logic in multiple places.

However, call flow tasks are often composed of multiple sub-tasks whose behavior varies depending upon various conditions present when the call flow is executed. Difficulties arise due to the interdependent nature of the call flow logic, as changes to the sub-task logic require changes in the parent task logic as well. Such changes to parent task logic are required, for instance, when (1) the number of relevant conditions to a sub-task increases, or the response to these conditions changes, or (2) additional ways of rendering or performing a particular sub-task develop over time.

For example, the type of customer validation described above depends on various factors, including the type of customer. For an internal customer, the validation is done based on the employee ID and the manager's ID. For an external customer, the customer service representative asks for a support contract number. Based on contractual agreements, different questions need to be asked for validation purposes. As these contracts change, the current system requires changes to the actual contractual logic script, as well as updates to the conditional logic within every parent call flow script that invokes the appropriate validation script. Additionally, if additional types of validations need to be carried out (e.g., validating contracting employees), there is no seamless way to introduce the additional types without modifying the parent call flows. Thus, there exists a need to overcome at least one of the preceding deficiencies and limitations of the related art.

SUMMARY OF THE INVENTION

In first embodiments, the present invention provides a computer-implemented method of defining and dynamically invoking call flows in a call flow system, comprising:

defining, by a computing system, a plurality of call flows including a publisher call flow and a set of one or more subscriber call flows, the plurality of call flows facilitating a routing and a servicing of a request from a user of a call flow system;

defining, by the computing system, one or more trigger points, wherein a first trigger point of the one or more trigger points is included in the publisher call flow, and wherein a second trigger point of the one or more trigger points is capable of being included in any subscriber call flow of the set;

defining, by the computing system, one or more triggers included in the one or more subscriber call flows in a one-to-one correspondence, wherein at least one trigger of the one or more triggers specifies a late-binding reference to the first trigger point;

publishing, by the computing system, the plurality of call flows to a repository;

executing, by the computing system, the publisher call flow, the executing including determining an execution time;

dynamically modifying, by the computing system and at the execution time, the plurality of call flows without requiring a termination and a restart of the executing the publisher call flow.

In a first aspect of the method, the dynamically modifying comprises at least one of:

adding a first call flow to the plurality of call flows, the first call flow including a trigger that specifies a late-binding reference to a trigger point of the one or more trigger points, the adding performed without requiring a change to any call flow defined by the defining the plurality of call flows, and removing a second call flow from the set, the removing performed without requiring a change to any other call flow of the plurality of call flows.

In a second aspect of the method, the method further comprises:

defining, by the computing system, the trigger included in the first call flow to specify a late-binding reference to the first trigger point; and invoking, by the computing system, the first call flow at the execution time without requiring a termination of the executing the publisher call flow, wherein the dynamically modifying includes the adding the first call flow.

In a third aspect of the method, the method further comprises:

defining, by the computing system, the second trigger point in a first subscriber call flow of the set; and defining, by the computing system, the trigger included in the first call flow to specify a late-binding reference to the second trigger point, wherein the dynamically modifying includes the adding the first call flow, and wherein the adding the first call flow, the defining the second trigger point, and the defining the trigger do not require a termination of an execution of the publisher call flow and do not require a termination of an execution of the first subscriber call flow.

In a fourth aspect of the method, the method further comprises:

defining, by the computing system, the second trigger point in a first subscriber call flow of the set; and defining, by the computing system, the trigger included in the second call flow to specify a late-binding reference to the second trigger point, wherein the dynamically modifying includes the removing the second call flow, and wherein the removing the second call flow, the defining the second trigger point, and the defining the trigger do not require a termination of an execution of the publisher call flow and do not require a termination of an execution of the first subscriber call flow.

In a fifth aspect of the method, the executing the publisher call flow comprises locating, in the repository and by the computing system, at least one subscriber call flow of the set that includes any trigger of the at least one trigger.

In a sixth aspect of the method, the publishing comprises:

storing a representation of a subscriber call flow of the at least one subscriber call flow in the repository, the representation being in a general-purpose markup language, and the representation including a representation of a first trigger of the at least one trigger.

In a seventh aspect of the method, the locating comprises:

locating, in the representation of the first trigger, a first identifier of the publisher call flow; and locating, in the representation of the first trigger, a second identifier of the first trigger point.

In an eighth aspect of the method, the general-purpose markup language is eXtensible Markup Language.

In a ninth aspect of the method, the executing the publisher call flow comprises:

executing, by the computing system, the at least one subscriber call flow, wherein no pre-defined condition is included in the at least one subscriber call flow.

In a tenth aspect of the method, the executing the publisher call flow comprises:

executing, by the computing system, a subset of the at least one subscriber call flow based on an evaluation of at least one pre-defined condition, wherein the at least one pre-defined condition is included in a first subscriber call flow of the at least one subscriber call flow.

In a eleventh aspect of the method, the defining the one or more triggers comprises:

defining a Boolean condition included in a first trigger of the one or more triggers, the Boolean condition being the at least one pre-defined condition, and the first trigger included in the first subscriber call flow.

In a twelfth aspect of the method, the method further comprises:

identifying, by the computing system, that the Boolean condition is included in the first trigger; and evaluating, by the computing system, the Boolean condition in response to the identifying, wherein the executing the subset includes executing the first subscriber call flow if the evaluating determines that the Boolean condition is true, and wherein the executing the subset does not include executing the first subscriber call flow if the evaluating determines that the Boolean condition is false.

In a thirteenth aspect of the method, the evaluating comprises:

evaluating the Boolean condition without loading a set of logic of the first subscriber call flow into a memory of the computing system and without executing the first subscriber call flow.

In a fourteenth aspect of the method, the call flow system is a help center, the help center including the computing system and one or more human representatives, and the help center capable of receiving the request from the user, routing the request to a human representative of the one or more human representatives, and providing a service associated with the request.

A system and a computer program product corresponding to the above-summarized method are also described and claimed herein.

Advantageously, the present invention provides a seamless introduction of new subscriber call flow logic or a modification of existing subscriber call flow logic, without requiring a modification of a publisher call flow. Further, the polymorphic call flow technique described herein provides a quick creation of call flows by allowing collaborative sharing of call flow definition responsibilities among multiple call flow architects (i.e., responsibilities may be shared between the architects that define the publisher call flow and the architects that understand and define the specialized subscriber call flows). Still further, the present invention allows true re-use of call flows from other call flows, without requiring that the call flows be present at creation time.

BRIEF DESCRIPTION OF THE DRAWINGS

FIG. 4D is a table summarizing executions of call flows of FIGS. 4A, 4B and 4C depending on an evaluation of conditions included in the call flows of FIGS. 4B and 4C, in accordance with embodiments of the present invention.

DETAILED DESCRIPTION OF THE INVENTION

Overview & Definitions

The present invention provides a method and system that defines and dynamically invokes polymorphic call flows (a.k.a. work flows). As used herein, a polymorphic call flow is defined to be a call flow that includes a late binding reference to another call flow. A late binding reference allows the reference and the referenced call flow to be defined separately at authoring time, while the referenced call flow is located and executed only at execution time.

As used herein, a call flow is a self-contained block that includes logic to perform a specified function as a set of ordered steps (a.k.a. actions) in a problem resolution handling process provided by a help center (e.g., global call management system). During the problem resolution handling process, one or more call flows are executed to guide a user's request for a service from receipt of the request to provision of the service. Each step of a call flow is modeled by a representation that indicates (1) a task to be performed in the problem resolution handling process, and (2) an entity that performs the task.

It should be understood that the term call flow, as used herein, encompasses all types of work flows associated with a help center, including those that process user requests received via a telephone, email, instant messaging, or web-based system.

As used herein, a help center is defined as a system that includes both a computing system comprising one or more computing applications and one or more human representatives. A help center receives a request for a service from a user of the system, routes the request to an appropriate representative, and provides the requested service. The help center receives the request from the user, for example, in a voice format via a telephone system, or in a web-based format, email, or instant message via the Internet. For instance, a customer of a computing device manufacturer uses a telephone system to call a global call management system provided by the manufacturer. The customer's call provides a request to resolve a problem the customer is having with a computing device.

Polymorphic Call Flow System

Figure 1:
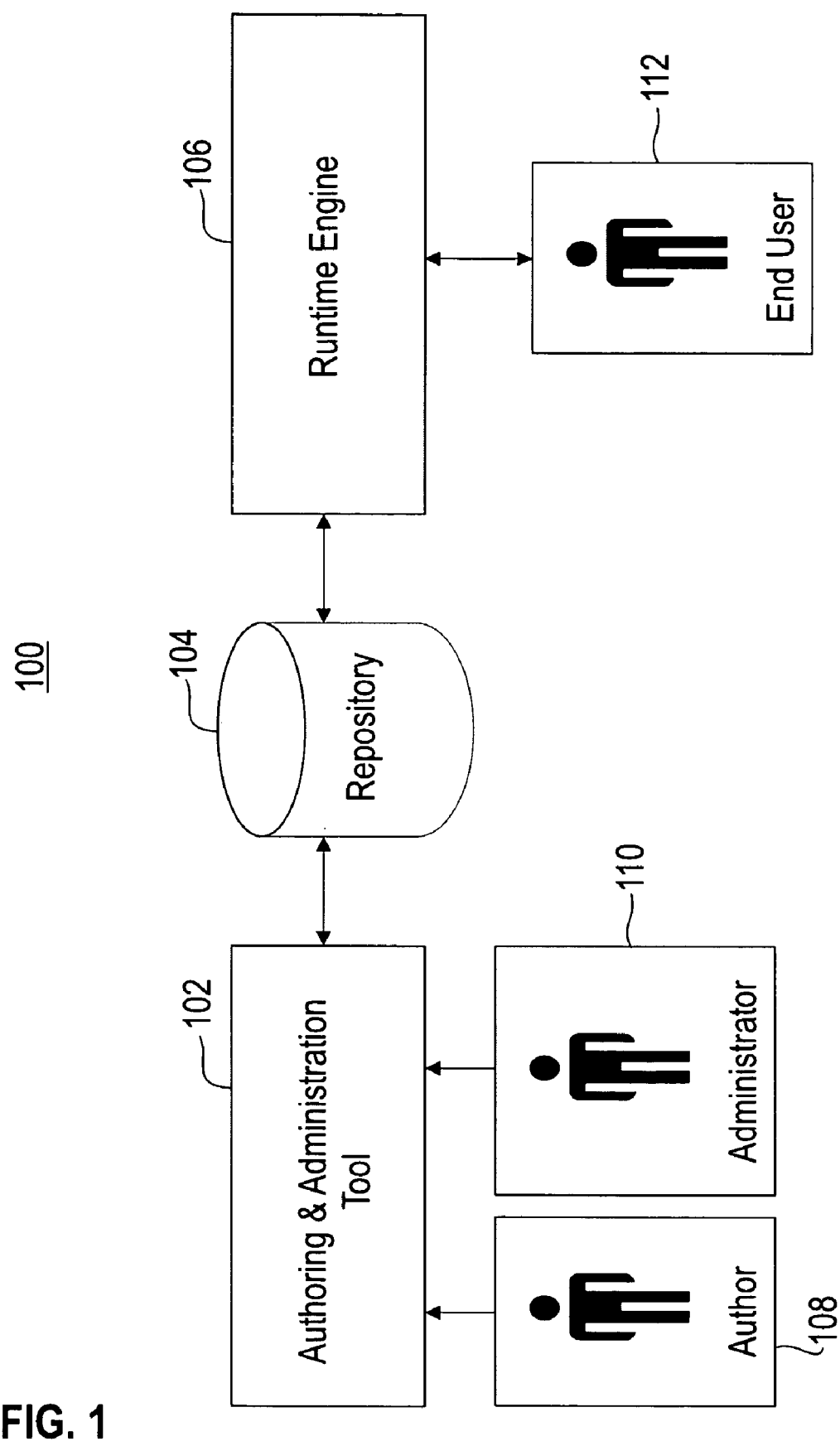
FIG. 1 is a block diagram of a system for defining and dynamically invoking polymorphic call flows, in accordance with embodiments of the present invention.

FIG. 1 is a block diagram of a system for defining and dynamically invoking polymorphic call flows, in accordance with embodiments of the present invention. System 100 includes a software-based authoring and administration tool 102, a data repository 104, and a runtime engine 106 (a.k.a. runtime component or runtime environment). An author 108 (e.g., business analyst) utilizes authoring and administration tool 102 to create, modify and test call flows. An administrator 110 utilizes authoring and administration tool 102 to activate and deactivate call flows and promote call flows into a production mode. The authoring and administration tool 102 communicates with repository 104 via a network. As used herein, a repository is defined as a computer-searchable collection of representations of call flows. In one embodiment, repository 104 stores representations of the call flows created by tool 102, and provides an interface to search, publish and retrieve the call flows stored therein. In one embodiment, repository 104 supports versioning of call flows and provides access to all of the versions simultaneously.

Author 108 uses tool 102 to create (a.k.a. specify or define), edit and test a call flow. After successfully testing the call flow, author 108 or another user of system 100 deploys (a.k.a. publishes) the call flow to repository 104 and requests a promotion of the call flow into a production environment. The deployment of the call flow makes the call flow available for retrieval by administrator 110. Administrator 110 is notified of the request for the promotion. Administrator 110 uses tool 102 to retrieve the call flow from repository 104, inspect and retest the call flow, and promote the call flow into the production environment.

Runtime engine 106 receives a request from an end user 112. The end user can be, for example, a customer of a company. The end user's request can, for instance, notify the company of an issue or problem that is to be resolved by system 100. The request from end user 112 is received by runtime engine 106 either directly or indirectly (e.g., via a customer service representative and a telephone system).

Runtime engine 106 interacts with repository 104 to retrieve, display and execute an appropriate call flow to service the request received from end user 112. The runtime engine 106 is a high performance, high availability runtime engine that allows call flows to be dynamically activated and deactivated (i.e., without terminating and restarting the runtime engine). Runtime engine 106 executes a call flow by utilizing, for example, Java® for eXtensible Markup Language (XML) processing (JAXP), Java® classes, and Agent Building and Learning Environment (ABLE) rule sets and ABLE learning agents. ABLE is a rule engine which is available from International Business Machines Corporation of Armonk, N.Y.

Defining Polymorphic Call Flows

Figure 2A:
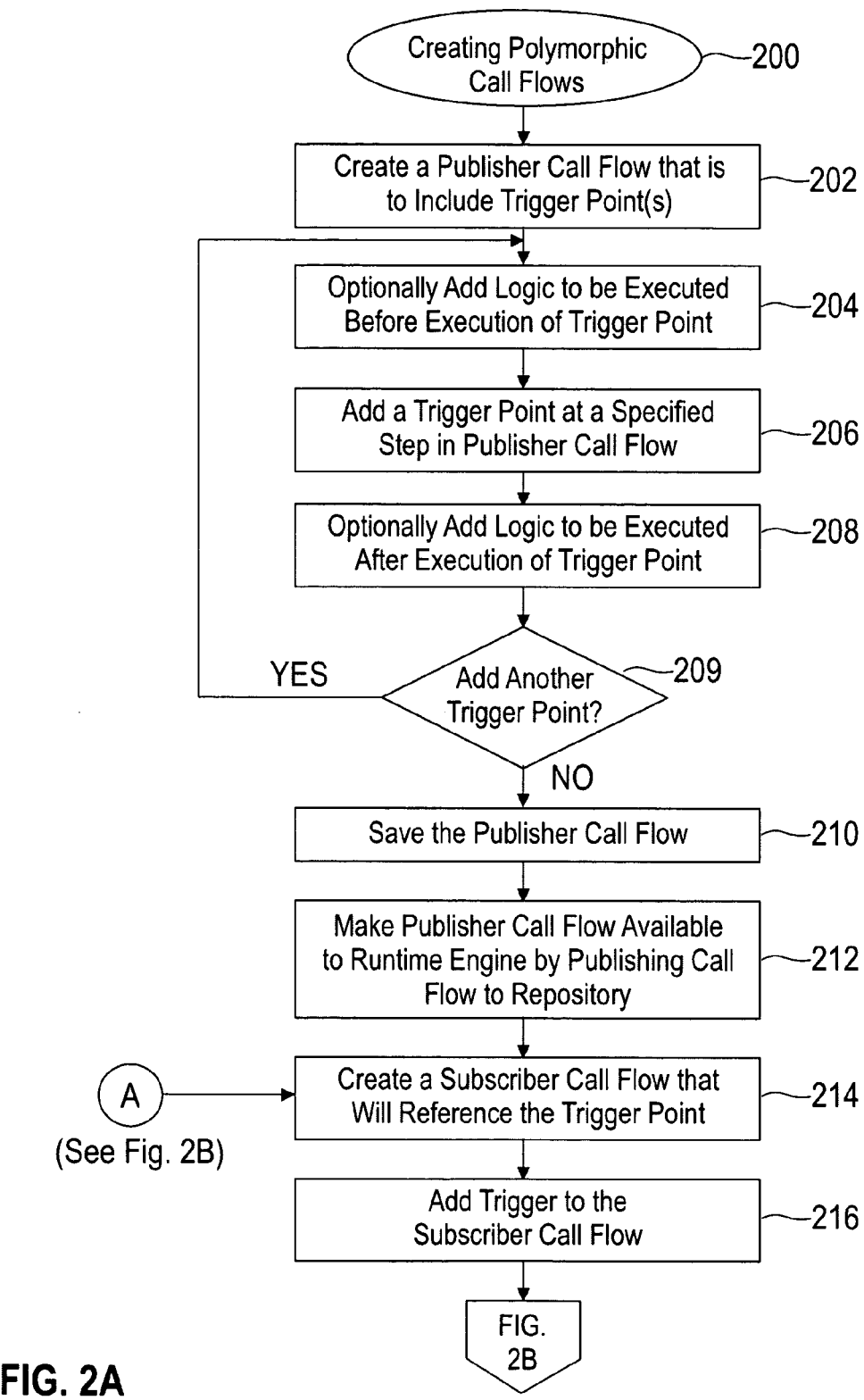
FIGS. 2A-2B depict a flow chart of a process for creating polymorphic call flows, in accordance with embodiments of the present invention.
Figure 2B:
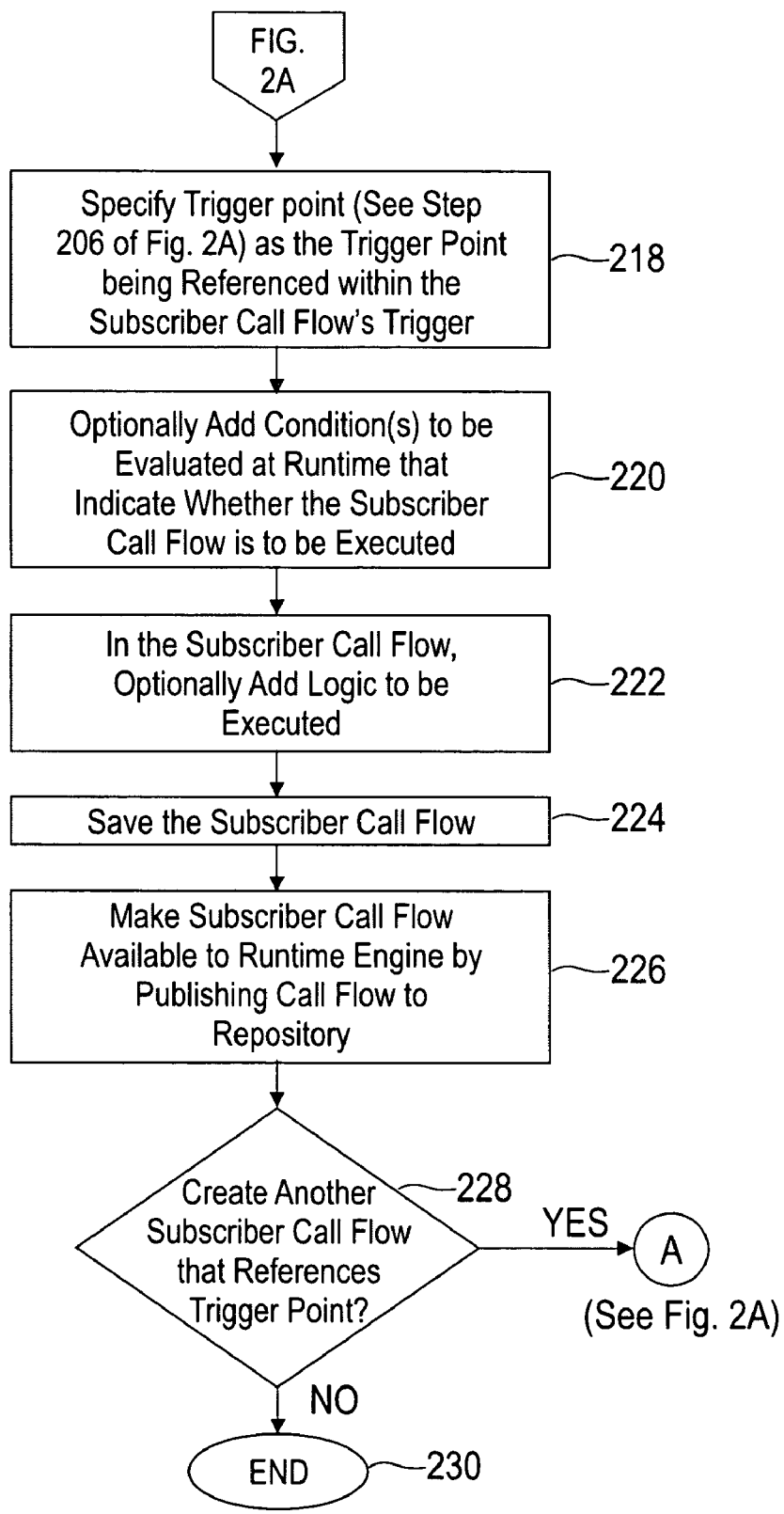

FIGS. 2A-2B depict a flow chart of a process for creating polymorphic call flows, in accordance with embodiments of the present invention. The process for creating (a.k.a. defining or authoring) polymorphic call flows starts at step 200. In step 202, a publisher call flow is created by author 108 (see FIG. 1) via authoring and administration tool 102 (see FIG. 1). One or more trigger points, which are discussed below, are to be added to the created publisher call flow. In optional step 204, author 108 (see FIG. 1) uses tool 102 (see FIG. 1) to add logic to the publisher call flow created in step 202. The added logic is to be executed before the execution of a trigger point. In step 206, author 108 (see FIG. 1) uses tool 102 (see FIG. 1) to add a trigger point at a specified step in the publisher call flow (i.e., the added trigger point is an action of the publisher call flow). In optional step 208, author 108 (see FIG. 1) uses tool 102 (see FIG. 1) to add logic to the publisher call flow. The logic added in step 208 is to be executed after the execution of the trigger point added in step 206. If inquiry step 209 determines that another trigger point is to be added, then the process repeats relative to the trigger point being added, starting at step 204; otherwise, the process continues with step 210.

In step 210, author 108 (see FIG. 1) uses tool 102 (see FIG. 1) to save the publisher call flow. In step 212, the publisher call flow is published to repository 104 (see FIG. 1), thereby making the publisher call flow available to runtime engine 106 (see FIG. 1) is saved. In step 214, author 108 (see FIG. 1) uses tool 102 (see FIG. 1) to create a subscriber call flow that will reference the trigger point added in step 206. Author 108 (see FIG. 1) adds a trigger to the subscriber call flow in step 216.

Continuing the polymorphic call flow creation process in FIG. 2B, the trigger point added in step 206 (see FIG. 2A) is specified as the trigger point referenced within the trigger added in step 216 (see FIG. 2A). This specification of the trigger point within the trigger indicates that a late binding reference is to occur. The indicated late binding reference actually occurs during an execution of the publisher and subscriber call flows (see FIG. 3). In optional step 220, author 108 (see FIG. 1) uses tool 102 (see FIG. 1) to add one or more conditions (i.e., Boolean conditions) to the subscriber call flow created in step 214 (see FIG. 2A). The Boolean condition(s) are to be evaluated at an execution time determined by the execution of the publisher call flow. The evaluation of the condition(s) indicates whether logic of the subscriber call flow is to be executed. That is, if the evaluation of the Boolean condition(s) provides a true value, then the logic of the subscriber call flow is executed. Further, if the evaluation of the Boolean condition(s) provides a false value, then the logic of the subscriber call flow is not executed.

In optional step 222, author 108 (see FIG. 1) adds logic to the subscriber call flow created in step 214 (see FIG. 2A). The logic added in step 222 is executed at execution time if there are no conditions added in step 220, or is executed at execution time if the condition(s) added in step 220 are evaluated as a true value. In step 224, the subscriber call flow is saved. In step 226, the subscriber call flow is published to repository 104 (see FIG. 1), thereby making the subscriber call flow available to runtime engine 106 (see FIG. 1). If inquiry step 228 determines that another subscriber call flow needs to be created that references the trigger point of step 206 (see FIG. 2A), then the process repeats starting at step 214 (see FIG. 2A); otherwise, the process ends at step 230.

In one embodiment, the logic of step 222 includes one or more trigger points and is added in steps analogous to steps 204, 206 and 208 of FIG. 2A. These one or more trigger points allow a first subscriber call flow to also function as a publisher call flow. Any one of the first subscriber call flow's trigger points is referenced by a late binding reference specified by a trigger in a second subscriber call flow. The trigger is added to the second subscriber call flow in step 216 of FIG. 2A.

XML Subscriber Call Flow

In one embodiment, call flows are stored in repository 104 (see FIG. 1) in a general-purpose markup language representation. An example of a general-purpose markup language is XML. One example of a trigger of a subscriber call flow created by the process of FIGS. 2A-2B is presented below in an excerpt of an XML document that represents a subscriber call flow. The trigger is represented as an element named "triggers," which includes child elements "conditions" and "callFlowReference." The "conditions" element includes one Boolean condition that must be evaluated as true in order for the subscriber call flow logic to be executed. The subscriber call flow logic is included in the same XML document as the trigger, but the logic is not shown in the excerpt presented below. The "callFlowReference" element includes an attribute that identifies the publisher call flow that includes the trigger point referenced by the trigger.

```
<triggers triggerPointId="{0DFCE25F-0608-F459-0915-78F7E41E835C}"
triggerPointName="Gather Info Extension">
   <condition id="{58864AAA-44CD-11B5-3824-963C0BE26683}"
   maxConnections="1"
maxReferringConnections="1" default="false" operator="and">
      <predicates operator="contains" value="XYZ" data="///@data.0"/>
   </condition>
   <callFlowReference id="{CEC02690-3173-ACF1-AC93-
   E4264D9444DA}" name="Demo -
Gather Customer Info"/>
</triggers>
```

Executing Polymorphic Call Flows

Figure 3:
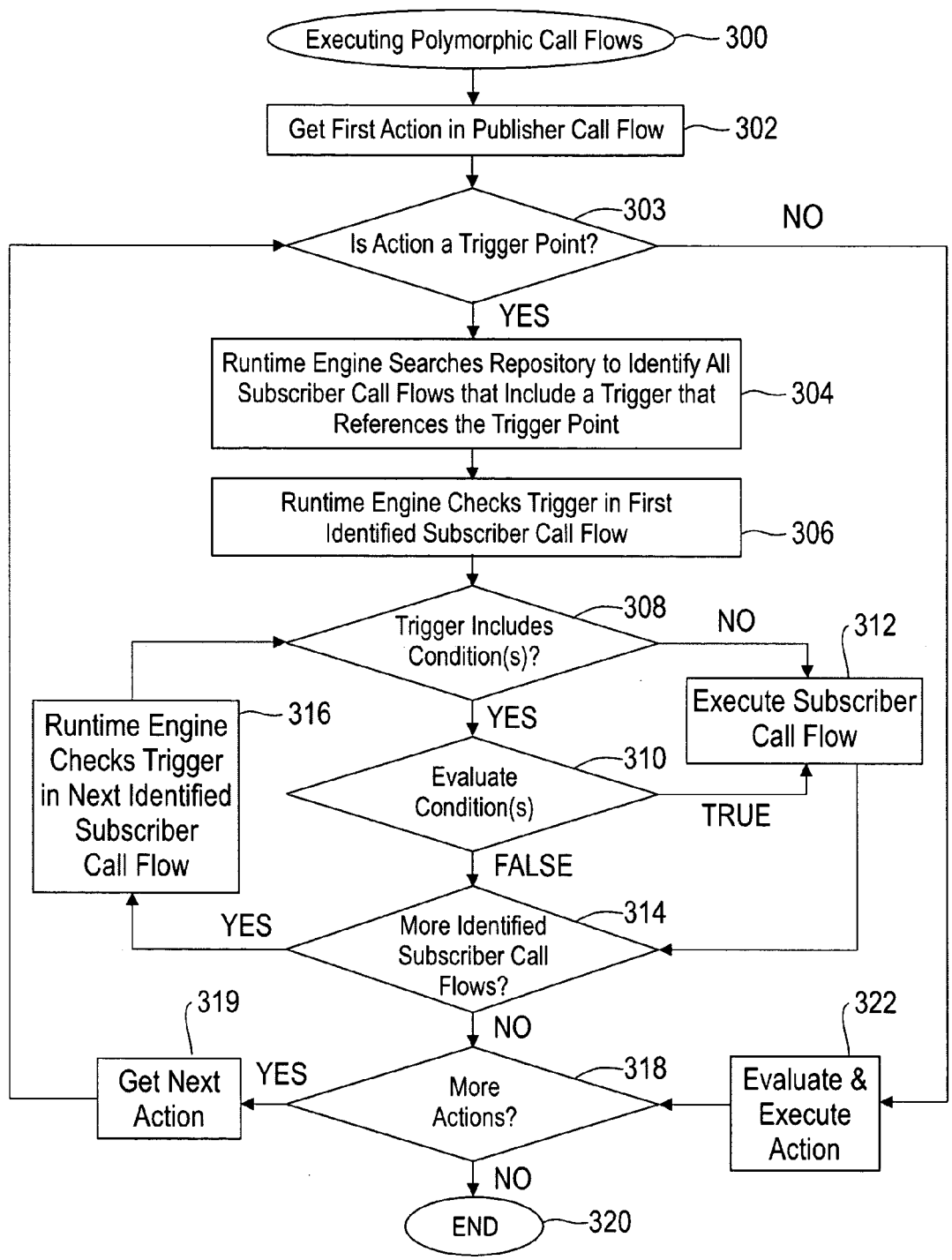
FIG. 3 depicts a flow chart of a process for executing polymorphic call flows, in accordance with embodiments of the present invention.

FIG. 3 depicts a flow chart of a process for executing polymorphic call flows, in accordance with embodiments of the present invention. The polymorphic call flow execution process starts at step 300. In step 302, the first action in a publisher call flow is obtained at an execution time determined by an execution of the publisher call flow. If inquiry step 303 determines that the action is a trigger point, then runtime engine 106 (see FIG. 1) searches repository 104 in step 304 to identify all subscriber call flows that include a trigger that references the trigger point. Step 304 initiates the late binding that was specified by the trigger point and trigger definitions of FIGS. 2A-2B. In step 306, runtime engine 106 (see FIG. 1) checks the trigger in the first subscriber call flow identified in step 304. If inquiry step 308 determines that the trigger checked in step 308 includes one or more Boolean conditions, then step 310 evaluates the Boolean condition(s) to obtain a True or a False value (i.e., evaluates the Boolean condition(s) as True or False). If step 310 evaluates the Boolean condition(s) as True, the subscriber call flow of step 306 is executed in step 312. Step 312 is also performed if inquiry step 308 determines that no conditions are included in the trigger checked in step 306. Following step 312 or if inquiry step 310 evaluates the Boolean condition(s) as False, inquiry step 314 determines if there are more subscriber call flows that were identified in step 304. If there are more subscriber call flows, then runtime engine 106 (see FIG. 1) checks, in step 316, the trigger in the next identified subscriber call flow, and the process repeats starting at step 308. If there are no other subscriber call flows that were identified in step 304, then inquiry step 318 determines if there are more actions to be obtained from the publisher call flow. If step 318 determines that there are more actions, step 319 obtains the next action in the publisher call flow and the process repeats starting at step 303, with the repeated steps performed relative to the action obtained in step 319.

If inquiry step 303 determines that the action obtained in step 302 or step 319 is not a trigger point, then step 322 evaluates and executes the non-trigger point action, and the process continues with inquiry step 318 determining if there are more actions in the publisher call flow. If inquiry step 318 determines that there are no more actions in the publisher call flow, then the process ends at step 320.

In a first embodiment, a plurality of call flows is defined using the process of FIGS. 2A-2B to facilitate routing and servicing a request of a user of a call flow system. The plurality of call flows includes a publisher call flow having a trigger point and at least one subscriber call flow that includes a trigger that references the trigger point. The runtime engine starts executing the publisher call flow according to the process of FIG. 3. At execution time of the publisher call flow, the call flow system is dynamically modified by (1) adding a first call flow to the plurality of call flows where the first call flow includes a trigger referencing a trigger point of the publisher call flow or (2) removing a second call flow from the plurality of call flows.

In the first embodiment, the addition the first call flow is completed via the process of FIGS. 2A-2B, which includes a definition of the first call flow via authoring and administration tool 102 (see FIG. 1) and a publishing of the first call flow to repository 104 (see FIG. 1). The addition of the first call flow is performed without requiring a change to any previously defined call flow. Following the addition of the first call flow, the first call flow is invoked at execution time by runtime engine 106 (see FIG. 1). That is, the first call flow is invoked during the execution process of FIG. 3 relative to the publisher call flow, without requiring a termination or restart of the execution of the publisher call flow.

Further, the removal of the second call flow in the first embodiment is completed via authoring and administration tool 102 (see FIG. 1), which deletes the second call flow's representation from repository 104 (see FIG. 1). The removal of the second call flow is performed without requiring a change to any other call flow of the plurality of call flows.

In a second embodiment, a plurality of call flows is defined and the runtime engine starts executing the publisher call flow as described above in the first embodiment. The plurality of call flows includes a first subscriber call flow. A trigger point to be referenced by a trigger via a late binding reference is defined in the first subscriber call flow (i.e., the first subscriber call flow is also functioning as another publisher call flow). The first subscriber call flow also includes a trigger that references the publisher call flow and is executed during the process of FIG. 3. Again, during the execution of the publisher call flow, the call flow system is dynamically modified by adding a first call flow to the plurality of call flows or (2) removing a second call flow from the plurality of call flows.

In the second embodiment, a trigger is defined in the first call flow that specifies a late binding reference to the trigger point of the first subscriber call flow. The adding of the first call flow, the defining of the trigger in the first call flow and the defining of the trigger point in the first subscriber call flow do not require terminating the execution of the publisher call flow or the termination of the execution of the first subscriber call flow.

Following the addition of the first call flow in the second embodiment, the first call flow is invoked at execution time by runtime engine 106 (see FIG. 1). That is, the first call flow is invoked during the execution process of FIG. 3, without requiring a termination or restart of the execution of the publisher call flow or the first subscriber call flow.

In the second embodiment, a trigger is defined in the second call flow that specifies a late binding reference to the trigger point of the first subscriber call flow. The removal of the second call flow in the second embodiment is completed via authoring and administration tool 102 (see FIG. 1), which deletes the second call flow's representation from repository 104 (see FIG. 1). The removal of the second call flow, the defining of the trigger of the second call flow, and the defining of the trigger point of the first subscriber call flow do not require terminating or restarting the execution of the publisher call flow or the first subscriber call flow.

EXAMPLES

Figure 4A:
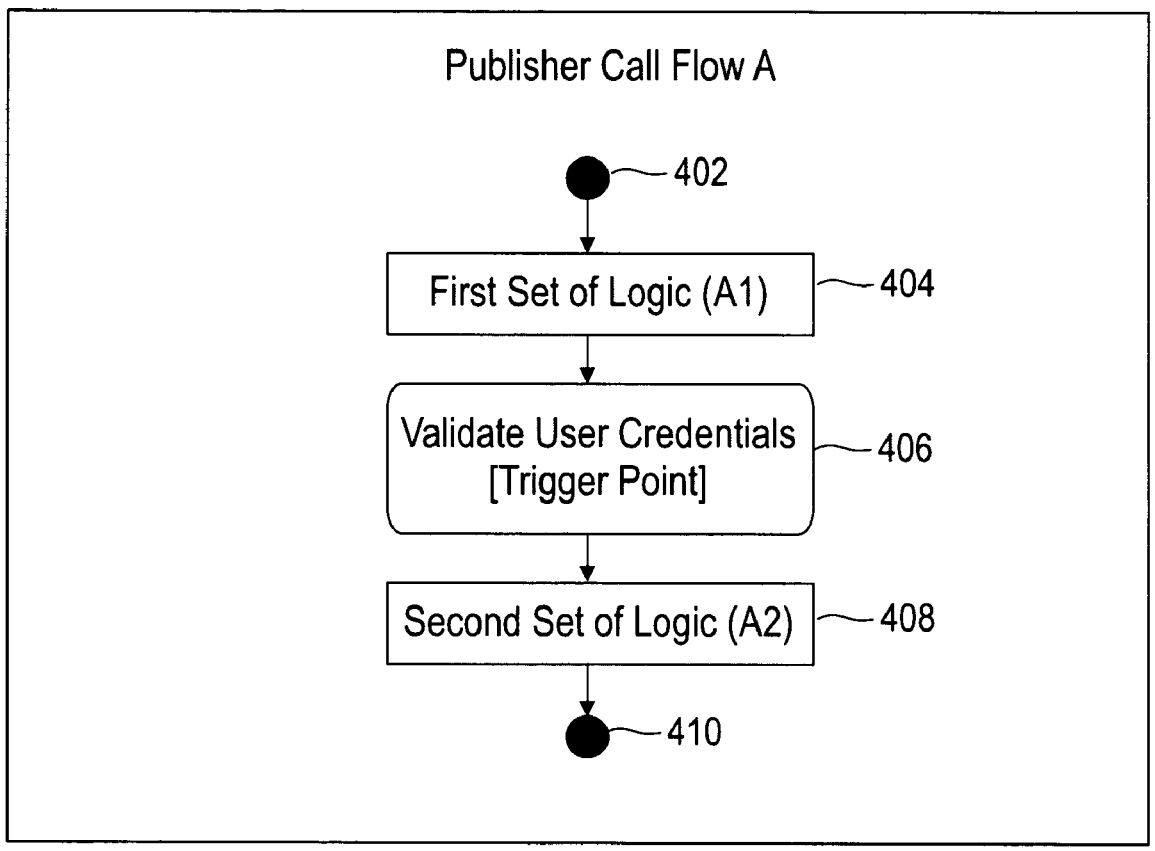
FIG. 4A is an exemplary publisher call flow that includes a trigger point, in accordance with embodiments of the present invention.

FIG. 4A is an exemplary publisher call flow that includes a trigger point, in accordance with embodiments of the present invention. Publisher call flow 400 starts at indicator 402. A first set of logic 404 (hereinafter also referred to as A1) includes one or more actions that are executed prior to action 406. Action 406 is a trigger point named "Validate User Credentials." Trigger point 406 is defined at authoring time to be referenced by one or more late binding references specified by one or more triggers. At execution time, execution of trigger point 406 initiates a search by runtime engine 106 (see FIG. 1) of repository 104 (see FIG. 1) to identify all subscriber call flows that include a "Validate User Credentials" trigger (see FIGS. 4B and 4C). Subsequent to the execution of trigger point 406, a second set of logic 408 (hereinafter also referred to as A2) is executed and publisher call flow 400 ends at indicator 410.

Figure 4B:
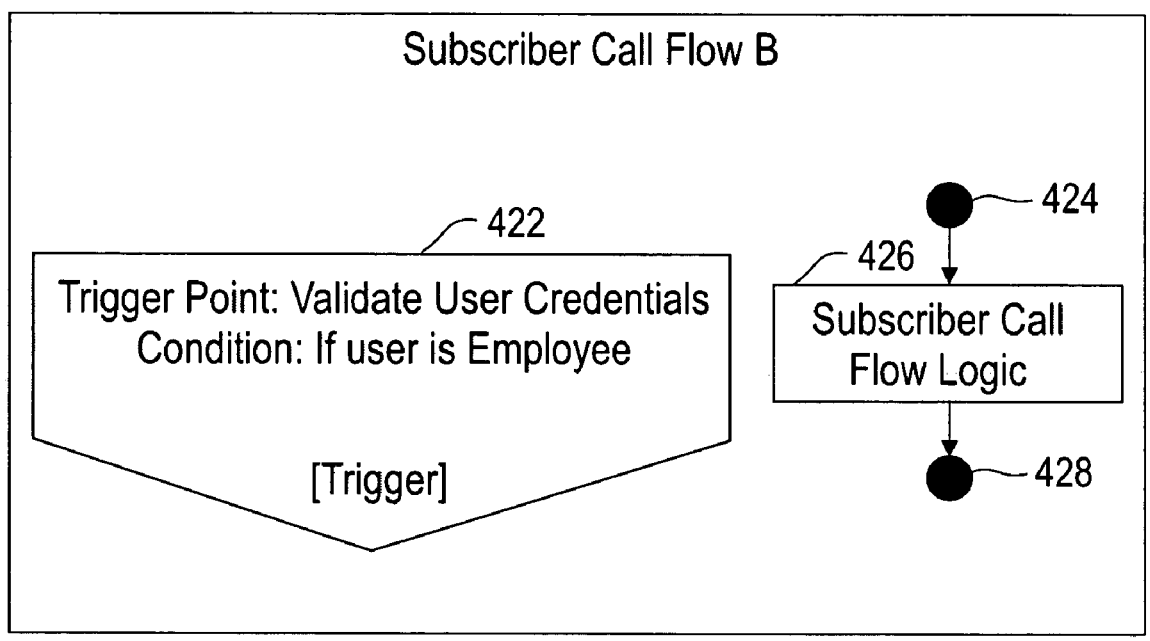
FIG. 4B is a first exemplary subscriber call flow that includes a first trigger referencing the trigger point of FIG. 4A, in accordance with embodiments of the present invention.

FIG. 4B is a first exemplary subscriber call flow that includes a first trigger referencing the trigger point of FIG. 4A, in accordance with embodiments of the present invention. Subscriber call flow 420 (a.k.a. call flow B) includes a trigger 422 that references trigger point 406 (see FIG. 4A). Trigger 422 has the same name, "Validate User Credentials" as the trigger point it references. Trigger 422 also includes a condition that is true if the user is an employee. If the user is an employee (i.e., the condition is true), the flow of execution starts at indicator 424, executes subscriber call flow logic 426 and ends at indicator 428. The logic 426 of subscriber call flow 420 is not executed if the user is not an employee (i.e., the condition of trigger 422 is false).

Figure 4C:
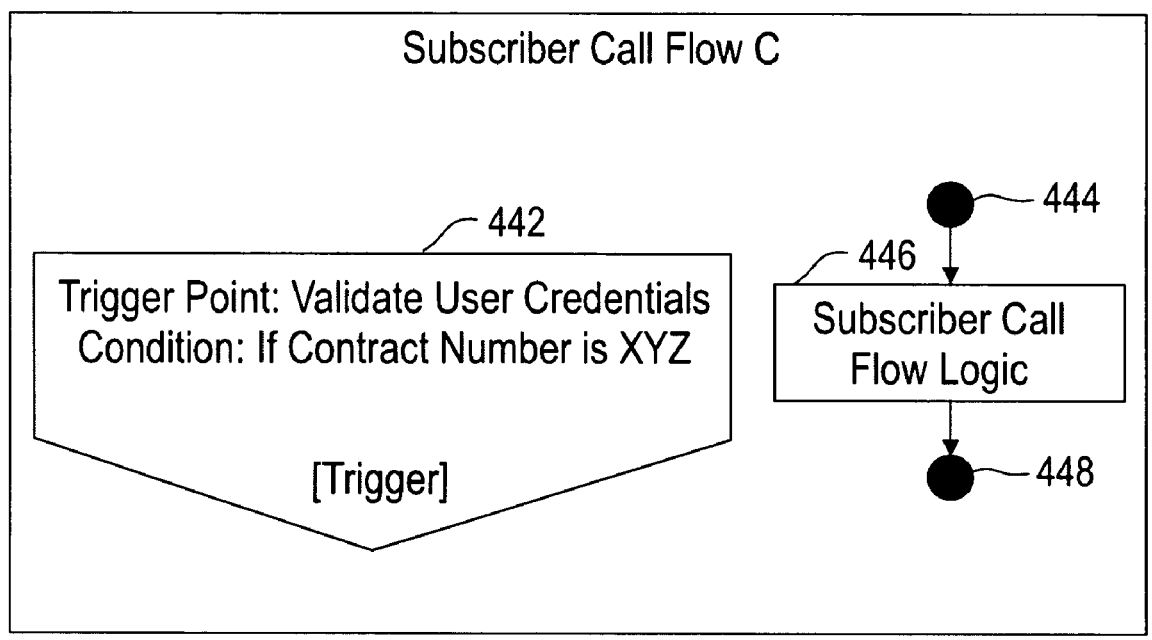
FIG. 4C is a second exemplary subscriber call flow that includes a second trigger referencing the trigger point of FIG. 4A, in accordance with embodiments of the present invention.

FIG. 4C is a second exemplary subscriber call flow that includes a second trigger referencing the trigger point of FIG. 4A, in accordance with embodiments of the present invention. Like trigger 422 of FIG. 4B, subscriber call flow 440 (a.k.a. call flow C) includes a trigger 442 that is also named "Validate User Credentials." Unlike trigger 422 in FIG. 4B, trigger 442 includes a condition that is true if the contract number is XYZ. If the contract number is XYZ, (i.e., the condition in trigger 442 is true), the flow of execution starts at indicator 444, executes subscriber call flow logic 446 and ends at indicator 448. The logic 446 of subscriber call flow 440 is not executed if the contract number is not XYZ (i.e., the condition of trigger 442 is false).

FIG. 4D is a table summarizing executions of call flows of FIGS. 4A, 4B and 4C depending on an evaluation of conditions included in the call flows of FIGS. 4B and 4C, in accordance with embodiments of the present invention. In its first row of data, table 460 indicates that if the user is not an employee and the contract number is ABC, then the series of call flow executions is A1 followed by A2. In this case, neither call flow B nor call flow C is executed because the conditions in call flow 420 and call flow 440 are both false (i.e., the user is not an employee and the contract number is not XYZ).

The second data row of table 460 indicates that if the user is an employee and the contract number is ABC, then the series of call flow executions comprises A1, call flow B, and A2. In this case, since the condition of trigger 422 (see FIG. 4B) is true (i.e., the user is an employee), call flow B is executed after A1. Further, since the condition of trigger 442 (see FIG. 4C) is false in this case (i.e., the contract number is not XYZ), call flow C is not executed.

The third data row of table 460 indicates that if the user is not an employee and the contract number is XYZ, then the series of call flow executions comprises A1, call flow C, and A2. In this case, since the condition of trigger 442 (see FIG. 4C) is true (i.e., the contract number is XYZ), call flow C is executed after A1. Call flow B is not executed because the condition of trigger 422 (see FIG. 4B) is false (i.e., the user is not an employee).

The fourth data row of table 460 indicates that if the user is an employee and the contract number is XYZ, then the series of call flow executions comprises A1, call flow B, call flow C and A2. In this case, since the conditions of trigger 422 and trigger 442 are both true (i.e., the user is an employee and the contract number is XYZ), both call flow B and call flow C are executed after A1.

Figure 4E:
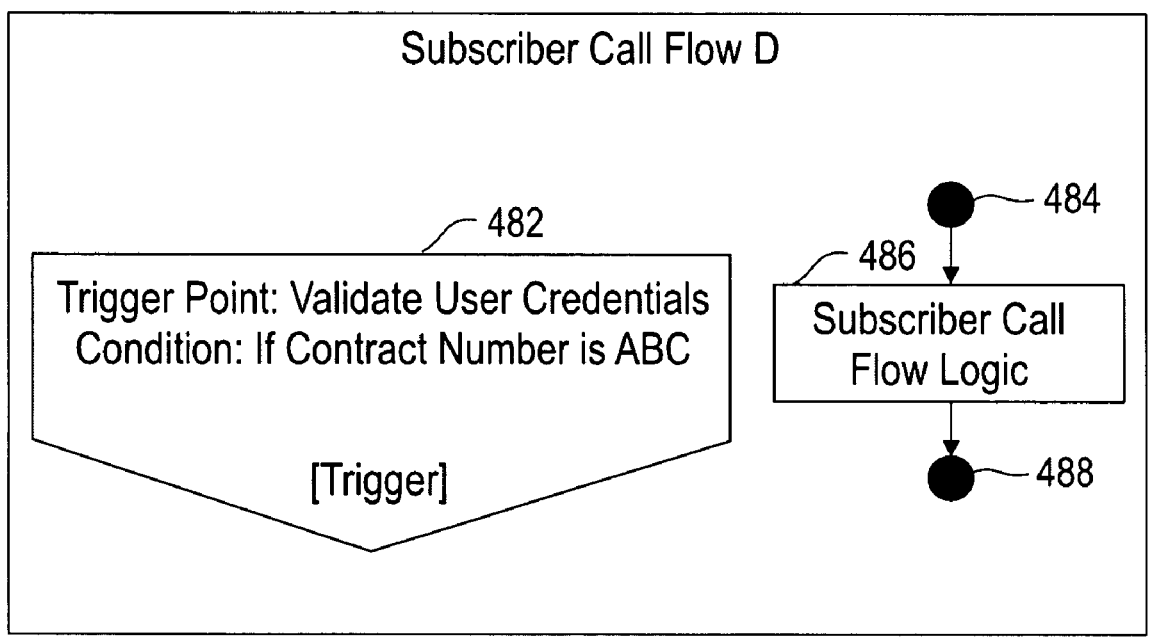
FIG. 4E is a third exemplary subscriber call flow that encapsulates changes to the set of call flows in FIGS. 4A, 4B and 4C, in accordance with embodiments of the present invention.

FIG. 4E is a third exemplary subscriber call flow that encapsulates changes to the set of call flows in FIGS. 4A, 4B and 4C, in accordance with embodiments of the present invention. The present invention facilitates the maintenance of a call flow system (e.g., system 100 of FIG. 1) by allowing an update to a call flow in the system (e.g., an addition of call flow 480) without affecting any other call flow in the system, without requiring a change to any other call flow of the system, and without requiring a termination and a restart of an execution of logic of any call flow of the system.

For example, system 100 (see FIG. 1) defines a base set of call flows that execute a problem resolution process. The base set includes call flows 400, 420 and 440 (see FIGS. 4A, 4B and 4C, respectively). Trigger point 406 (see FIG. 4A) is used to customize the problem resolution process to a particular customer by adding call flow 480 (a.k.a. call flow D), which specifies the customization via a trigger 482 and logic 486. Call flow D is dynamically added during the call flow execution process of FIG. 3 (i.e., at an execution time indicated by the execution of call flow 400 of FIG. 4A). Trigger 482 references trigger point 406 (see FIG. 4A) and includes a condition that is true if the contract number is ABC. If step 310 of FIG. 3 evaluates the condition in trigger 482 as being true, then the flow of execution starts at indicator 484, executes logic 486 of subscriber call flow D, and ends at indicator 488. Thus, call flow D is added without requiring a change, retest, or a termination and a restart of the base set of call flows. That is, all changes associated with the customization are encapsulated within the newly added call flow D. Further, after call flow D is added, call flow D is seamlessly invoked by the call flow system during the call flow execution process of FIG. 3, without requiring a change to or a termination and restart of any of the call flows of the system.

Computing System

Figure 5:
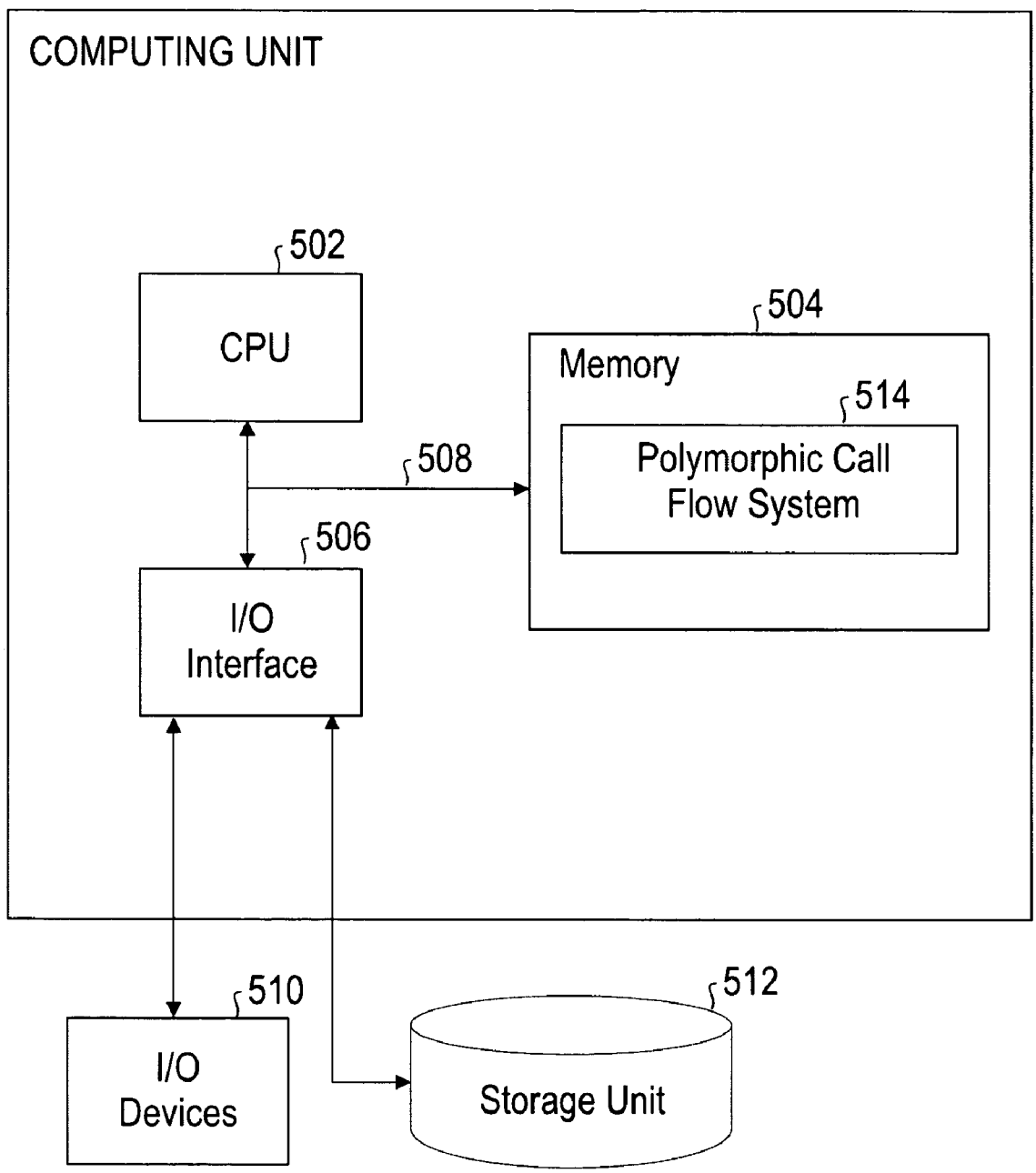
FIG. 5 is a block diagram of a computing unit 500 for implementing the methods of FIGS. 2A, 2B and 3, in accordance with embodiments of the present invention.

FIG. 5 is a block diagram of a computing unit 500 for implementing the methods of FIGS. 2A, 2B and 3, in accordance with embodiments of the present invention. Computing unit 500 is suitable for storing and/or executing program code of a polymorphic call flow system 514, and generally comprises a central processing unit (CPU) 502, a memory 504, an input/output (I/O) interface 506, a bus 508, I/O devices 510 and a storage unit 512. CPU 502 performs computation and control functions of computing unit 500. CPU 502 may comprise a single processing unit, or be distributed across one or more processing units in one or more locations (e.g., on a client and server).

Local memory elements of memory 504 are employed during actual execution of the program code of polymorphic call flow system 514. Cache memory elements of memory 504 provide temporary storage of at least some program code in order to reduce the number of times code must be retrieved from bulk storage during execution. Further, memory 504 may include other systems not shown in FIG. 5, such as an operating system (e.g., Linux) that runs on CPU 502 and provides control of various components within and/or connected to computing unit 500.

Memory 504 may comprise any known type of data storage and/or transmission media, including bulk storage, magnetic media, optical media, random access memory (RAM), read-only memory (ROM), a data cache, a data object, etc. Storage unit 512 is, for example, a magnetic disk drive or an optical disk drive that stores data (e.g., XML representations of work flows). Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown).

I/O interface 506 comprises any system for exchanging information to or from an external source. I/O devices 510 comprise any known type of external device, including a display monitor, keyboard, mouse, printer, speakers, handheld device, printer, facsimile, etc. Bus 508 provides a communication link between each of the components in computing unit 500, and may comprise any type of transmission link, including electrical, optical, wireless, etc.

I/O interface 506 also allows computing unit 500 to store and retrieve information (e.g., program instructions or data) from an auxiliary storage device (e.g., storage unit 512). The auxiliary storage device may be a non-volatile storage device (e.g., a CD-ROM drive which receives a CD-ROM disk). Computing unit 500 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of polymorphic call flow system 514 for use by or in connection with a computing unit 500 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 504, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of defining and dynamically invoking call flows in a call flow system, comprising:

defining, by a computing system, a plurality of call flows including a publisher call flow and a set of one or more subscriber call flows, said plurality of call flows facilitating a routing and a servicing of a request from a user of a call flow system;

defining, by said computing system, one or more trigger points, wherein a first trigger point of said one or more trigger points is included in said publisher call flow, and wherein a second trigger point of said one or more trigger points is capable of being included in any subscriber call flow of said set of one or more subscriber call flows;

defining, by said computing system, one or more triggers included in said one or more subscriber call flows in a one-to-one correspondence, wherein at least one trigger of said one or more triggers specifies a late-binding reference to said first trigger point;

defining, by said computing system, said second trigger point in a first subscriber call flow of said set of one or more subscriber call flows;

defining, by said computing system, a trigger included in a first call flow, wherein said trigger specifies a late-binding reference to said second trigger point;

publishing, by said computing system, said plurality of call flows to a repository, wherein said publishing includes storing, in said repository, a representation of a second subscriber call flow of said set of one or more subscriber call flows, said representation of said second subscriber call flow being in a general-purpose markup language, and said representation of said second subscriber call flow including a representation of a first trigger of said at least one trigger;

executing, by said computing system, said publisher call flow, wherein said executing said publisher call flow includes determining an execution time, locating, in said representation of said first trigger, a first identifier of said publisher call flow, and locating, in said representation of said first trigger, a second identifier of said first trigger point;

dynamically modifying, by said computing system and at said execution time, said plurality of call flows without requiring a termination and a restart of said executing said publisher call flow, wherein said dynamically modifying includes adding said first call flow to said plurality of call flows, said adding performed without requiring a change to any call flow defined by said defining said plurality of call flows.

\* \* \* \* \*